United States Patent [19]

Koch et al.

[11] 4,400,218
[45] Aug. 23, 1983

[54] APPARATUS FOR THE CONTINUOUS MANUFACTURE OF GLUCOSE CONTAINING PRODUCTS

[75] Inventors: Klaus Koch, Laatzen; Gerhard Syrbius, Grossburgwedel, both of Fed. Rep. of Germany

[73] Assignee: Hermann Berstorff Maschinenbau GmbH, Hanover, Fed. Rep. of Germany

[21] Appl. No.: 355,156

[22] Filed: Mar. 5, 1982

[30] Foreign Application Priority Data

Mar. 9, 1981 [DE] Fed. Rep. of Germany ....... 3108823

[51] Int. Cl.³ ............................................. C13K 1/02
[52] U.S. Cl. ......................................... 127/1; 127/28; 127/37; 422/137; 422/229; 366/83; 366/85; 366/88
[58] Field of Search ............................ 366/83, 85, 88; 422/137, 229; 127/1, 28, 37

[56] References Cited

U.S. PATENT DOCUMENTS 3,477,873  11/1969  Koelsch ............................. 127/4 X
4,316,747   2/1982  Rugg et al. ....................... 127/28 X

Primary Examiner—Ferris H. Lander
Attorney, Agent, or Firm—Schwartz, Jeffery, Schwaab, Mack, Blumenthal & Koch

[57] ABSTRACT

Glucose-containing products can be manufactured in apparatus comprising a continuous screw conveyor member rotatable in a continuous press cylinder having three regions in cascade arrangement between an intake opening and an output opening. The regions comprise an intake region for the rapid and economical intake of different kinds of products, a compression region for building up a very high pressure of from about 20 to 300 bars for disintegrating the products and for heating the product by intensive shearing thereof to a temperature of up to 250° C., and a catalyst injection region for intensive action on and mixing or hydrolysis of the cellulosic substances with trifluoroacetic acid or the like injected through nozzles.

Thus glucose-containing products can be hydrolyzed by the action of trifluoroacetic acid, in apparatus in which all the working steps to be carried out can be performed continuously, without having to use individual pieces of equipment such as soaking containers, boilers, refiners and corresponding connecting ducts and valves.

14 Claims, 8 Drawing Figures

APPARATUS FOR THE CONTINUOUS MANUFACTURE OF GLUCOSE CONTAINING PRODUCTS

The invention relates to apparatus for the continuous manufacture of glucose-containing products.

Considerable significance is to be attributed to the conversion of cellulosic substances into glucose, for economic reasons. German Patent Specification No. 27 27 552 discloses a method using trifluoroacetic acid as a disintegrating agent or catalyst. The use of trifluoroacetic acid for the hydrolytic break-down of cellulose substances to form glucose has the important advantage that there is no need to neutralize the disintegration agent because trifluoroacetic acid can be completely removed by simply being evaporated off, and recovered by condensing it. In addition, using trifluoroacetic acid as the catalyst can result in a high yield of break-down substances in the form of glucose, and a very rapid break-down reaction.

However, for carrying out the method, the above-mentioned German Patent Specification describes a discontinuously operating apparatus which does not allow the use of trifluoroacetic acid to achieve a break-through. In addition, also disclosed in a pressure-less break-down method which also only results in economically insignificant yields.

Thus, for carrying out the process, the previously proposed equipment comprises soaking containers for attaining long soaking time, boilers for a heating operation and for reaction of the cellulosic substances which are mixed with trifluoroacetic acid, and water containers for lowering the level of trifluoroacetic acid concentration. In total, 45 minutes are required in Example 1 of the specification for conversion of a single charge of cellophane cuttings or pulp. It is apparent that such a succession of pieces of equipment does not result in the manufacture of glucose-containing products being economically viable.

The invention has among its objects to provide apparatus for continuously and highly economically manufacturing glucose-containing products, in which all operating steps to be performed can be carried out in the apparatus without having to use individual devices for that purpose, such as for example soaking containers, boilers, refiners and connecting conduits and interposed valves.

According to the invention there is provided apparatus for the continuous manufacture of glucose-containing products, comprising a press cylinder with a drivable rotary screw conveyor member arranged coaxially therein, a material intake opening adjacent one end of the press cylinder, and a material output opening adjacent the other end and openable only when a preselected pressure in the cylinder is exceeded, wherein the screw conveyor member and the press cylinder together form, in cascade between the intake opening and output opening, an intake region, a compression region in which pins project from the cylinder towards the axis of the screw conveyor member and a catalyst injection region.

Providing the screw conveyor member in a press cylinder which has in succession an intake region, a compression region and a catalyst injection region, permits glucose-containing products to be quickly and economically drawn into the apparatus, subjected in the compression region to a very high pressure of up to 300 bars and thereby to a disintegration effect, and also heated to a temperature of up to 250° C. by a shearing effect, and then fed with trifluoroacetic acid in the catalyst injection region.

The apparatus can therefore operate in a completely continuous mode and with a very high rate of output.

Advantageously the screw conveyor member comprises a first part which extends through said intake region and said compression region and is driven from the material feed end, and a second part which extends through the catalyst injection region and is driven from the material discharge end and the press cylinder extends continuously through the intake region, the compression region and the catalyst injection region.

Such apparatus can have the important advantage that it can operate at a higher or lower speed of rotation in the catalyst injection region than in the intake and compression regions, thereby making it easier to adapt the apparatus to given materials.

An advantageous embodiment has the screw conveyor member extending as a continuous member through all three regions and provided in a continuous press cylinder. This apparatus can be very cost-effective in regard to manufacture and can also be very compact and not likely to suffer from break-down, because all three working regions can be integrated into each other without any seals and connecting conduits or pipes. As the screw conveyor member is also mounted only at one end and in a pressure-less region, there cannot be any leakage with the very high pressures required, in the compression region and the catalyst injection region.

A further and in particular very space-saving embodiment has the press cylinder provided in two parts comprising a first part which extends horizontally through the intake region and the compression region and a second part which is flange-connected to the first part and extends vertically through the catalyst injection region and the screw conveyor is also provided in two parts with a first part within said first part of the press cylinder and a second part which is driven by way of an angle transmission from said first part and extends through the second part of the press cylinder.

Grooves in a helical configuration and of opposite hand to the handing of the screw conveyor member or helical grooves which are of the same handing as the screw conveyor member are preferably provided in the inner peripheral surface of the press cylinder in the intake region, in order to prevent material engaged by the screw from being rotated therewith, thereby to increase the intake capacity. The grooves may be of square, rectangular or semi-circular cross-section.

Advantageously, in the compression region, the pins extend radially through the press cylinder and to approximately the level of the base of the thread of the screw conveyor member, interruptions which are of an axial length corresponding to the diameter of said pins being provided in the helical screw flight of the screw conveyor member.

The material is subjected to a very thorough disintegration process in the compression region. In particular however, a very high pressure is built up because the material is entirely prevented from rotating with the screw conveyor member, by the pins, and the screw conveyor member flight portions which are provided between the individual pin planes cause the material to be pressed to the next pin plane.

By virtue of this extremely intensive loading, the material is also subjected to a very severe shearing effect, whereby a very large amount of heat is generated in the material.

The temperature in the press cylinder can be strongly influenced by regulating the speed of rotation of the conveyor member. The temperature required for rapid reaction of the cellulosic substances which are supplied with trifluoroacetic acid can be produced exclusively by shearing of the material in the press cylinder, apart from the start-up phase. Heating the material by a shearing effect has the great advantage that the temperature is produced over the entire cross-section of the respective parts of the press cylinder, thereby making it possible to eliminate the conventional form of heating, which is very time-consuming and energy-intensive, by heat conduction, in the known boilers. The rapid reaction is substantially ensured by the extremely intensive shearing effect produced in the material, that is to say, by the rapid rise in temperature of the substances in the whole pressure region of the press cylinder.

Enlarging the area of the cross-section of the catalyst injection region available to contain material, compared with the corresponding cross-section in the compression region, by from 1 to 5 times provides free volume for the injected trifluoroacetic acid and the heated water, in which respect more or less trifluoroacetic acid may be injected, depending on the cellulosic substances to be reacted and the reaction time.

Such enlargement can be effected by increasing the diameter of the press cylinder and/or by reducing the core diameter of the screw conveyor member in the catalyst injection region. Increasing the volume by reducing the core diameter of the screw conveyor member has the advantage that the diameter of the press cylinder can be the same in all three regions. This gives considerable advantages, in particular in regard to manufacture of the press cylinder.

Injection spray nozzles for the trifluoroacetic acid and heated water can project through the wall of the catalyst injection region, radially towards the axis of the screw conveyor member. With this arrangement, the injection spray nozzles may project by different distances into the injection region, in order to promote improved distribution of the trifluoroacetic acid, throughout the volume of that region.

Inclined mixing elements may be arranged on the screw conveyor member in the injection region, to provide for intensive mixing and to convey the material to the output opening.

In order to initiate the conversion reaction while the material is still in the compression region, catalyst injection nozzles can also be disposed in the compression region particularly at the downstream end thereof.

A given conveyor effect must be maintained in the catalyst injection region, while at the same time there is intensive mixing of the constituents. For that purpose, it is advantageous if in that region the injection nozzles also extend approximately to the base of the thread of the screw conveyor member and screw flights which are only slightly smaller in diameter than the cylinder diameter in that region are arranged on the core of the screw conveyor member. The screw flights are obviously interrupted where the injection nozzles project approximately to the base of the screw thread.

This very advantageous construction in respect of the catalyst injection region, on the one hand, can ensure a very high conveyor pressure, comparable to the pressure in the compression region, by virtue of the arrangement of the injection nozzles between the interrupted flights. On the other hand, by virtue of this construction of the catalyst injection region, the catalyst is sprayed in, and further disintegration of the substances is produced, while the substances are simultaneously being intensively mixed and acted upon by the catalyst, more particularly additionally in different planes, by virtue of the differences in the depth of engagement of the nozzles in the injection region.

The invention is diagrammatically illustrated by way of example in the accompanying drawings, in which.

Figure 1:
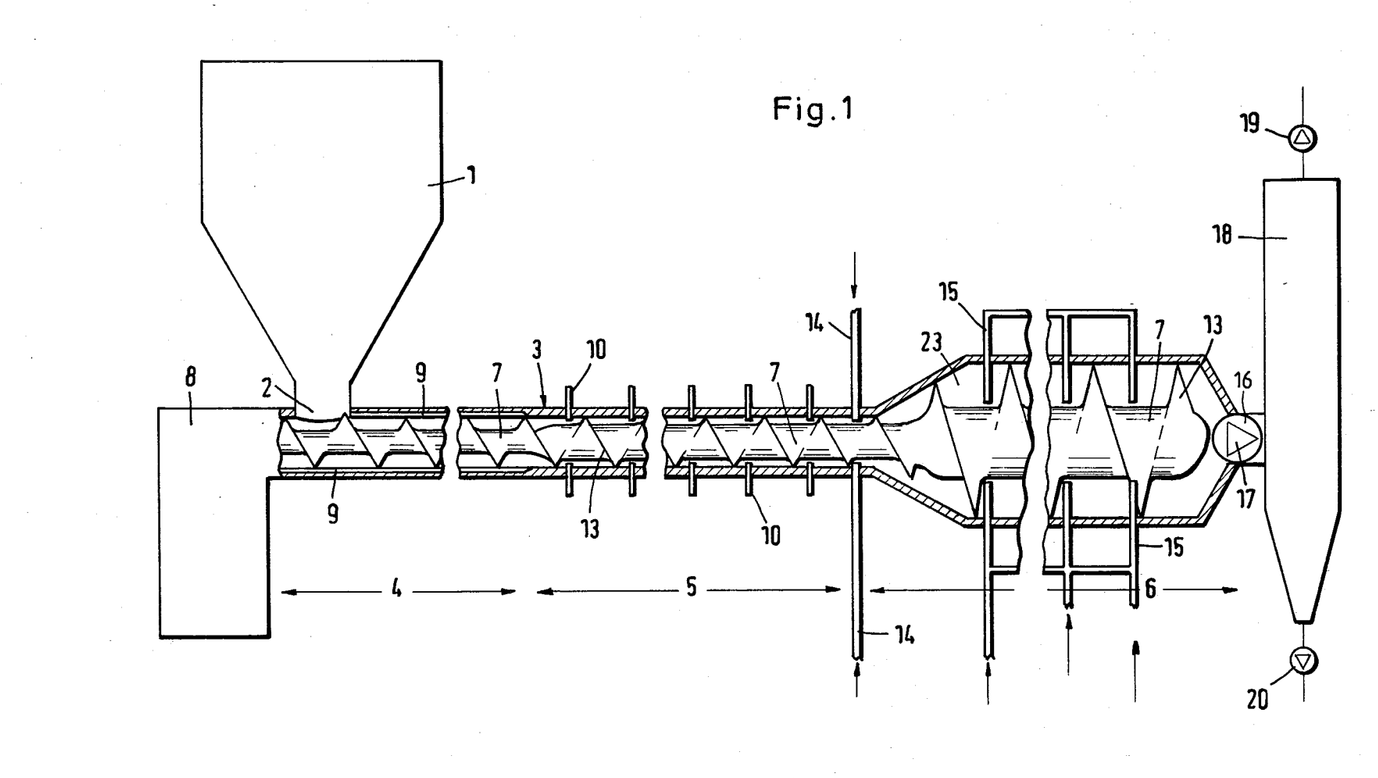
FIG. 1 shows a view in longitudinal section through a preferred embodiment of apparatus according to the invention.

Referring to the drawings and firstly to FIG. 1, materials containing cellulosic substances such as for example waste paper, sawdust, straw and similar biomasses are introduced into a container 1 in the form of a mush or pulp or similar form, and pass through a material intake opening 2 into a press cylinder 3.

The press cylinder 3 is subdivided into three regions, namely an intake region 4, a compression region 5 and a catalyst injection region 6.

A screw conveyor member 7 rotates in the press cylinder, and, in this embodiment, is formed as a single member which extends through all three regions 4 to 6.

The screw conveyor 7 is driven in rotation by a drive unit 8 and can be steplessly controlled in respect of its peripheral speed.

Formed in the press cylinder in the intake region 4 thereof are axial grooves 9 of a square or other rectangular cross-section. The grooves 9 prevent the material from rotating with the screw 7 and thus ensure that the material is properly drawn into the press cylinder 3.

Figure 3:
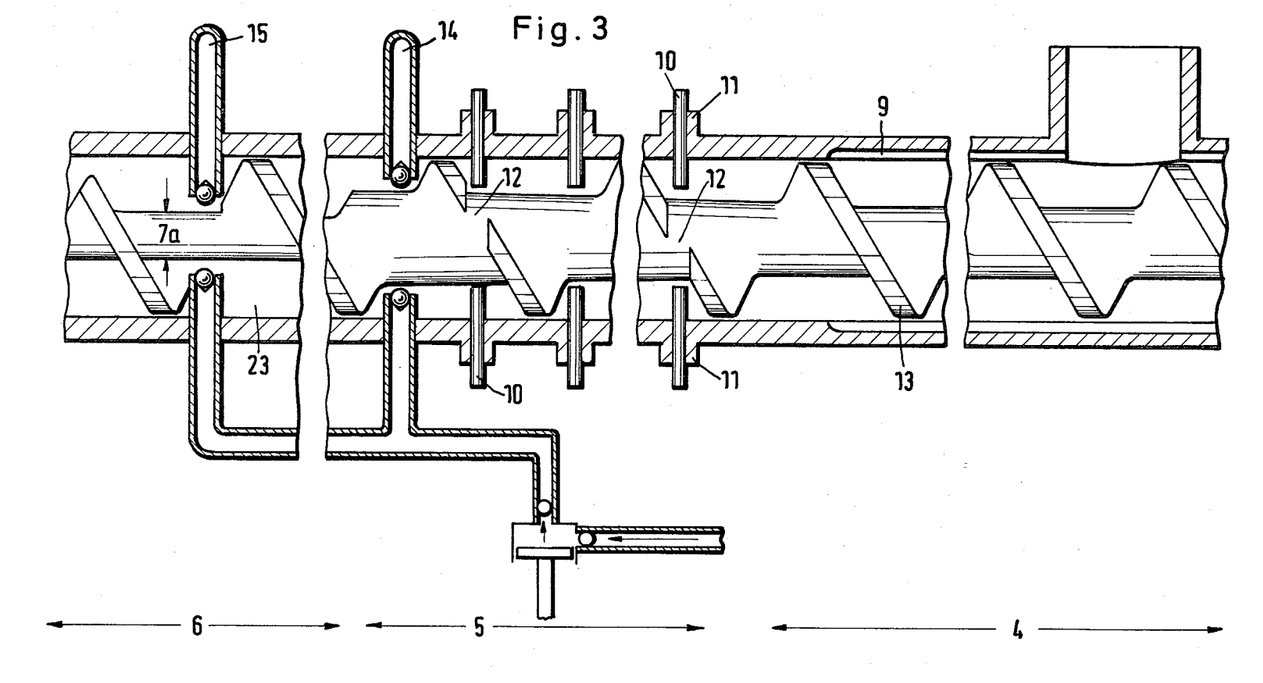
FIG. 3 shows a view in longitudinal section of another embodiment of apparatus according to the invention, with a continuous press cylinder and a screw conveyor member having a reduced core diameter in the catalyst injection region.

The compression region 5 has pins 10 which are directed radially towards the axis of the conveyor member 7, are adjustable in respect of their depth of engagement and are locked by means of nuts 11 (see FIG. 3). FIG. 3 shows interruptions 12 in the screw flight 13 of the screw, with the axial length of each interruption approximately corresponding to the diameter of the pins 10 which are for example cylindrical.

In the compression region 5, the material is conveyed by the flights 13 and prevented from rotating with the screw conveyor member 7 by the pins 10. This therefore results in a very high pressure of up to 300 bars being built up, with a large amount of heat being developed at the same time, depending on the speed of rotation of the screw conveyor member 7, due to the friction caused by shearing of the material. The heat may cause the material to be heated up to a temperature of 250° C. The material after being processed in this way passes into the catalyst injection region 6 in which it can spend a suitable residence time, because of the increased area of cross-section available to the material, in order to adjust the reaction time required. The reaction time can be controlled by way of the speed of rotation of the screw conveyor member 7 and also by way of adjustment of the pressure of an outlet valve 17 closing an output opening 16.

A concentrated trifluoroacetic acid is injected at the downstream end of the compression region 5 by means of injection nozzles 14 (see FIGS. 1 and 3), in order to initiate dissolution of the products while still in the compression region 5, whereby the reaction time can be reduced.

Figure 4:
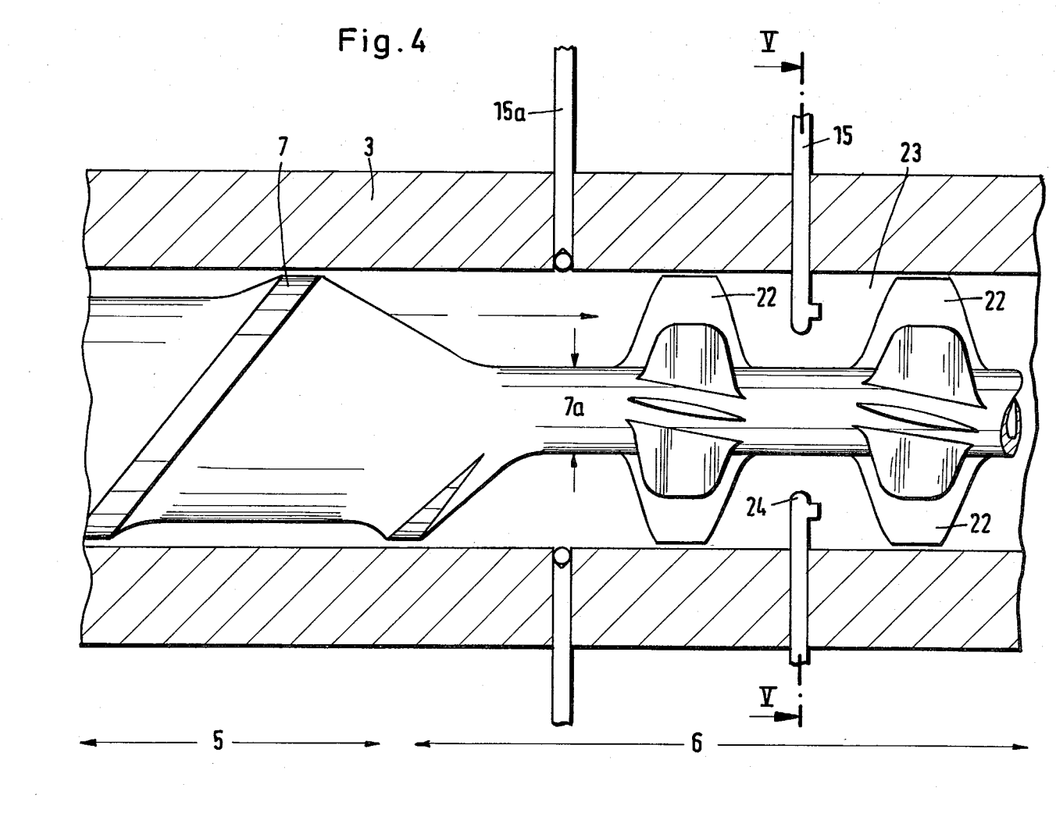
FIG. 4 shows paddle-shaped mixing elements provided in the catalyst injection region.
Figure 5:
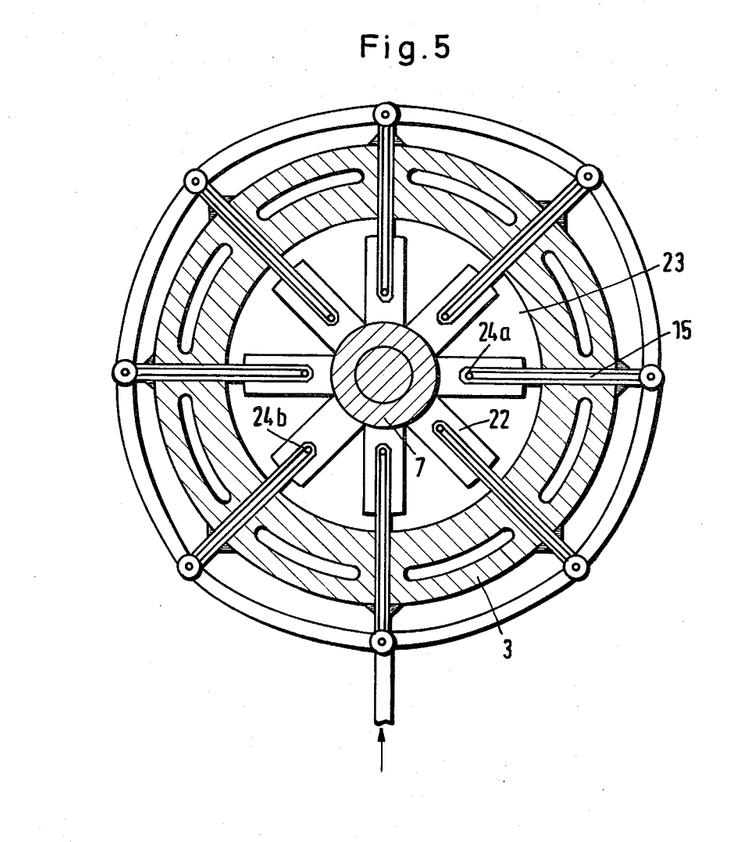
FIG. 5 is a view in cross-section taken on line V—V in FIG. 4, showing an injection nozzle plane.
Figure 6:
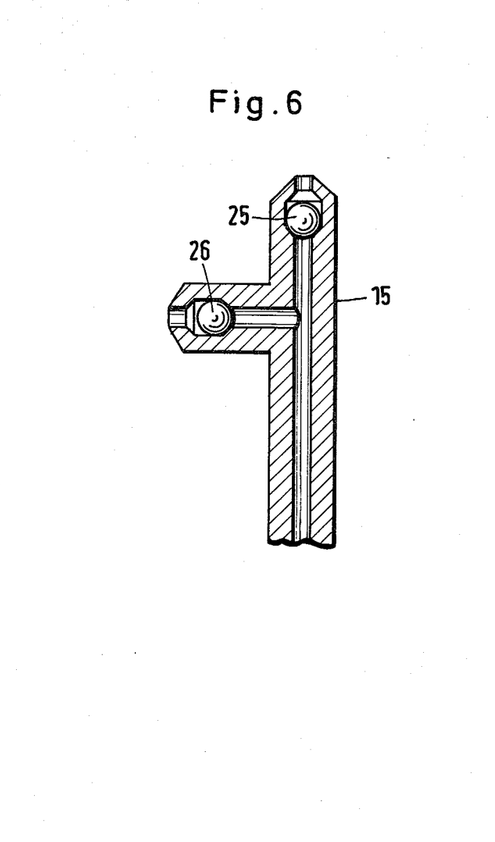
FIG. 6 shows a view in longitudinal section through an injection nozzle having two discharge openings.

The material is actually acted upon by trifluoroacetic acid in the catalyst injection region 6. The catalyst is injected through injection nozzles 15 under a pressure which exceeds the pressure in that region. As the injection nozzles may also project by difference amounts into the catalyst injection space 23, as shown in FIGS. 4, 5 and 6, this arrangement also causes intensive mixing of the catalyst with the material. Hot water is preferably injected in metered form into the catalyst injection region 6 by means of the downstream nozzles 15, in order to cause intensive hydrolysis.

The hydrolysed products must be pressed out of the region 6 through the outlet valve 17 which closes the output opening 16, as the valve 17 only opens when a preselected pressure is exceeded.

The converted product then passes into a container 18, wherein the trifluoroacetic acid moves upwardly in the form of vapour and is condensed in apparatus connected to a valve 19 to be available for re-use.

The hydrolysate is taken off by way of a valve 20 and passed to apparatus for further processing.

Figure 2:
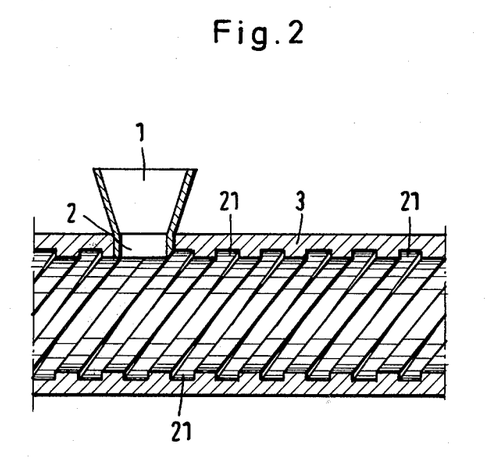
FIG. 2 shows a view in longitudinal section of the inner peripheral surface of a press cylinder of the apparatus of FIG. 1 in an intake region showing grooves therein.

FIG. 2 shows an embodiment wherein the press cylinder 3 has grooves 21 formed therein of square or other rectangular cross-section and extending in a helical configuration, corresponding to the pitch of the screw flight 13.

In the embodiment of FIG. 3 the catalyst has an increased area of cross-section available to the material compared with the regions 4 and 5 by providing a core portion 7a of the screw 7 in the region 6 to be of smaller diameter than the core portion of the screw 7 in the regions 4 and 5. Thus, the press cylinder 3 can be of a continuous construction of uniform diameter throughout thereby considerably facilitating and reducing the cost of manufacture thereof.

In the embodiment of FIG. 4, the screw conveyor member 7 has a core portion of reduced diameter, at 7a. In this embodiment, mixing elements 22 which are of a paddle-like configuration are disposed on the reduced-diameter core portion 7a, being disposed somewhat at an inclined angle relative to the axis of the screw conveyor member 7. This inclined arrangement produces a greater conveying effect.

Also shown are injection nozzles 15 which project into a reaction space 23 and nozzles 15a which terminate at the inner peripheral wall surface of the press cylinder 3.

FIG. 5 shows a view in cross-section from FIG. 4, illustrating the radial arrangement of the injection nozzles 15 which are directed towards the axis of the screw conveyor member 7. The injection nozzles 15 project into the press cylinder 3 by different distances. Reference 24a indicates a nozzle which projects into the cylinder by a large distance, while 24b denotes a shorter injection nozzle.

FIG. 6 shows an injection nozzle 15 having a ball closure member 25 and a further ball closure member 26 which is disposed laterally at a position approximately half way up, in order to provide for better distribution of the catalyst in the chamber 23.

Figure 7:
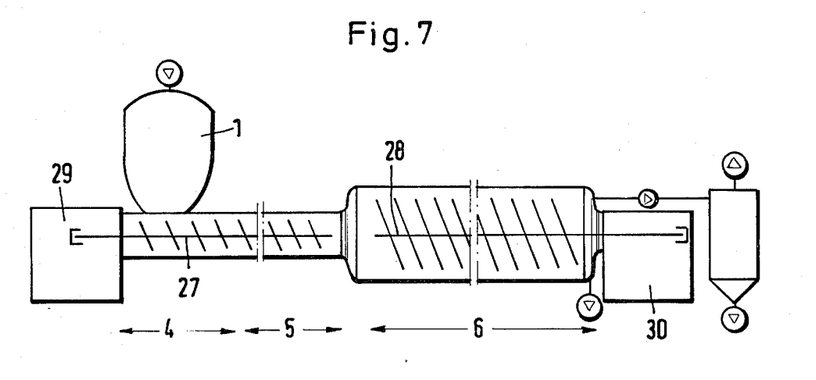
FIG. 7 shows a view in longitudinal section through an embodiment illustrated in highly diagrammatic form, illustrating a possible way of driving screw conveyor members separately by drive means located at opposite ends of the apparatus.

FIG. 7 shows an embodiment of the invention having two separately drivable screw conveyor members 27 and 28. The screw conveyor member 27 arranged in the intake and compression regions 4 and 5 is constructed as shown in FIGS. 1 and 3 and the screw conveyor member 28 in the catalyst injection region 6 is constructed as shown in FIGS. 1 and 3.

The screw conveyor member 27 is driven by a drive unit 29 while the screw conveyor member 28 is driven by a drive unit 30. This construction has the significant advantage that the two screw conveyor members 27 and 28 can be driven at different peripheral speeds to give the apparatus a wider range of possibilities in regard to adaptation to individual technological requirements, for example longer or shorter residence times.

Figure 8:
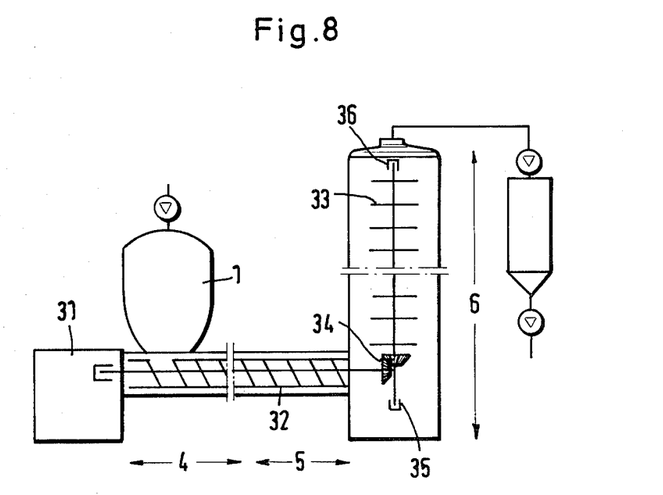
FIG. 8 shows a view in longitudinal section through a further embodiment of apparatus according to the invention with a vertically arranged catalyst injection unit.

The embodiment shown in FIG. 8 permits the apparatus to be set up in a considerably reduced area. A drive unit 31 rotates a screw conveyor member 32 and also rotates a screw conveyor member 33 in the catalyst injection region 6, which screw conveyor member 33 is mounted in bearings 35 and 36, and driven from the conveyor member 32 by way of an angle transmission 34. The amount of floor area required for this apparatus is reduced to about half that required for the embodiment of FIG. 1.

What is claimed is:

1. Apparatus for the continuous manufacture of glucose-containing products, comprising:
   (a) press cylinder means defining an intake region, a compression region and a catalyst injection region,
   (b) a material intake opening communicating with said intake region for delivering said products to said press cylinder means,
   (c) a valved material output opening adjacent the end of said injection region and openable when a preselected pressure in said press cylinder means is exceeded,
   (d) a rotary screw conveyor means mounted in said press cylinder means and extending through said intake, compression and injection regions, the construction of said screw conveyor means and said press cylinder means in said injection region being such that the cross-sectional area and thus volume of said injection region available to material containment is substantially greater than in said compression region,
   (e) a plurality of pins extending radially inwardly through said press cylinder means in said compression region to a position adjacent the base of the thread of said screw conveyor means, the helical flights of said screw conveyor means being radially interrupted in the regions of said pins to permit rotation of said conveyor means, whereby high pressure is built up in said compression chamber with consequent disintegration of the material, and (f) catalyst injection nozzles extending through said press cylinder means in at least said injection region for admitting catalyst to such region, the catalyst and relatively greater cross-sectional volume in the injection region further intensifying the mixture and consequent disintegration of the material in said injection region prior to discharge.

2. Apparatus as claimed in claim 1, wherein said press cylinder means and said screw conveyor means each extend continuously throughout the combined length of said intake region, said compression region and said catalyst injection region.

3. Apparatus as claimed in claim 1, wherein said screw conveyor means comprises a first part which extends through said intake region and said compression region and is driven from one end of said cylinder means, and a second part which extends through said catalyst injection region and is driven from the other end of said cylinder means, wherein said press cylinder means extends continuously through said intake region, said compression region and said catalyst injection region.

4. Apparatus as claimed in claim 1, wherein said press cylinder comprises a first part which extends horizontally through said intake region and said compression region, and a second part which is flange-connected to said first part and extends vertically through said catalyst injection region, and wherein said screw conveyor means is also provided in two parts, with a first part within said first part of said press cylinder means and a second part which is driven by way of an angle transmission from said first part and extends through said second part of said press cylinder means.

5. Apparatus as claimed in claim 1, wherein grooves of a helical configuration and of a handing corresponding to the handing of the flights of said screw conveyor means are provided in the inner peripheral surface of said press cylinder means in said intake region.

6. Apparatus as claimed in claim 1, wherein grooves of a helical configuration and of a handing opposite to the handing of the flights of said screw conveyor means are provided in the inner peripheral surface of said press cylinder means in said intake region.

7. Apparatus as claimed in claim 1, wherein the cross-section area and thus volume of said catalyst injection region available to contain material is up five times larger than the corresponding cross-section area and volume of said compression region.

8. Apparatus as claimed in claim 1, further including mixing elements formed on said screw conveyor means in said catalyst injection region for promoting a conveying effect.

9. Apparatus as claimed in claim 1, further including catalyst injection nozzles disposed in said compression region.

10. Apparatus as claimed in claim 1, wherein said catalyst injection nozzles provided in said catalyst injection region extend into the path of screw flights of said screw conveyor means, and interruptions are formed in said flights of an axial length corresponding to the width of said injection nozzles.

11. The apparatus of claim 10 wherein said injection nozzles extend radially varying distances relative to said base of said screw conveyor means to enhance the catalytic mixing.

12. Apparatus as claimed in claim 1, further including paddle-shaped mixing elements arranged on said screw conveyor means in said injection region for scraping off the inside peripheral surface of said press cylinder means, said mixing elements also improving the conveying action.

13. The apparatus of claim 1 wherein the press cylinder means is continuous in diameter throughout the length thereof, and said base of said screw conveyor means is reduced in diameter in said injection region thereby to provide said increased area and volume in such region.

14. The apparatus of claim 1 wherein the diameter of said press cylinder means and screw conveyor means is increased in said injection region, with the respective diameters being such that the area and volume is still substantially larger than in said compression region.

* * * * *